(12) United States Patent
Sipper et al.

(10) Patent No.: US 11,547,042 B2
(45) Date of Patent: Jan. 10, 2023

(54) ADAPTIVE ENGINE SPEED CONTROL SYSTEM

(71) Applicant: DEERE & COMPANY, Moline, IL (US)

(72) Inventors: Zackary P. Sipper, Raleigh, NC (US); Jacob C. Kallara, Cary, NC (US); Brent G. Rinholm, Fuquay Varina, NC (US)

(73) Assignee: DEERE & COMPANY, Moline, IL (US)

( * ) Notice: Subject to any disclaimer, the term of this patent is extended or adjusted under 35 U.S.C. 154(b) by 420 days.

(21) Appl. No.: 16/802,069

(22) Filed: Feb. 26, 2020

(65) Prior Publication Data

US 2021/0259150 A1    Aug. 26, 2021

(51) Int. Cl.
| | |
|---|---|
| *A01D 34/44* | (2006.01) |
| *A01D 34/60* | (2006.01) |
| *F02D 35/00* | (2006.01) |
| *A01D 34/00* | (2006.01) |
| *F02D 31/00* | (2006.01) |
| *A01D 101/00* | (2006.01) |

(52) U.S. Cl.
CPC .......... *A01D 34/008* (2013.01); *A01D 34/44* (2013.01); *A01D 34/60* (2013.01); *F02D 31/001* (2013.01); *F02D 35/0007* (2013.01); *A01D 2101/00* (2013.01); *F02D 2200/602* (2013.01)

(58) Field of Classification Search
CPC ...... A01D 34/008; A01D 34/44; A01D 34/60; A01D 2101/00; F02D 31/001; F02D 35/0007; F02D 2200/602
USPC ..................................................... 56/10.2 A
See application file for complete search history.

(56) References Cited

U.S. PATENT DOCUMENTS

| | | | |
|---|---|---|---|
| 4,740,898 A | 4/1988 | McKee et al. | |
| 5,315,293 A | 5/1994 | Kamiya | |
| 5,934,400 A * | 8/1999 | Larsen ................... | B60K 31/02 180/170 |
| 6,092,355 A | 7/2000 | Ishmael | |
| 6,553,302 B2 | 4/2003 | Goodnight et al. | |
| 7,594,377 B1 | 9/2009 | Jansen et al. | |
| 7,735,592 B2 | 6/2010 | Bellot et al. | |
| 8,621,833 B2 | 1/2014 | Shida et al. | |
| 8,966,870 B2 | 3/2015 | MacKinnon et al. | |
| 9,002,585 B2 | 4/2015 | Porter et al. | |

(Continued)

FOREIGN PATENT DOCUMENTS

| | | | | |
|---|---|---|---|---|
| DE | 102016214885 A1 * | 3/2017 | .......... | A01D 34/006 |
| EP | 2105337 A1 | 9/2009 | | |

OTHER PUBLICATIONS

Extended European Search Report and Written Opinion issued in European Patent Application No. 21154286.5, dated Jul. 13, 2021, in 11 pages.

*Primary Examiner* — Mahmoud Gimie

(57) ABSTRACT

An adaptive engine speed control system for a grass mowing machine having an internal combustion engine, a hydrostatic traction drive circuit and a hydraulic mowing circuit for operating a plurality of cutting units. A controller provides a traction feedback output signal if the grass mowing machine is moving at an actual ground speed that is below a pedal based desired ground speed, and uses the traction feedback output signal to command the internal combustion engine to an increased speed above a pedal based engine speed control range.

11 Claims, 7 Drawing Sheets

(56) References Cited

U.S. PATENT DOCUMENTS

| | | | |
|---|---|---|---|
| 9,475,497 B2 | 10/2016 | Henson et al. | |
| 9,635,806 B2 | 5/2017 | Waitt et al. | |
| 2003/0047164 A1* | 3/2003 | Jaye | F02D 41/1402 123/352 |
| 2015/0315982 A1* | 11/2015 | Koenen | F02D 41/1402 123/403 |
| 2016/0177844 A1* | 6/2016 | Fuentes Utrilla | F02D 31/001 701/110 |
| 2016/0363209 A1* | 12/2016 | Lapp | B60K 17/105 |
| 2017/0042084 A1 | 2/2017 | Waitt et al. | |
| 2019/0126901 A1* | 5/2019 | Omran | B60W 10/02 |

\* cited by examiner

ADAPTIVE ENGINE SPEED CONTROL SYSTEM

FIELD OF THE INVENTION

This invention relates generally to grass mowing machines, and specifically to an adaptive engine speed control system for a riding greensmower, trim and surround mower or fairway mower.

BACKGROUND OF THE INVENTION

Grass mowing machines such as riding greensmowers, trim and surround mowers and fairway mowers may include internal combustion engines to power a hydrostatic traction drive circuit and hydraulic mowing circuit. The internal combustion engine may produce maximum power at maximum engine speed, but it may be desirable to run the engine at lower speeds to achieve better economy or noise reduction. Power requirements needed to maintain the desired ground speed may increase in sloping terrain or other conditions. Additionally, power requirements for hydraulic mowing circuits may increase in wet grass, verticutting or other conditions.

An engine speed control system for a mower is needed that can run at low power in economy or low noise modes, but can increase power if the mower encounters terrain or other circumstances with greater power requirements. An engine speed control system is needed that allows operators to only run the engine at speeds required for the work being done, and can adapt the engine speed when necessary. An engine speed control system is needed that reduces fuel consumption and noise levels experienced around the mower. An engine speed control system is needed that does not require sensors to measure hydraulic pressure of the hydrostatic traction drive circuit and/or hydraulic mowing circuit to determine power requirements.

SUMMARY OF THE INVENTION

An adaptive engine speed control system for a grass mowing machine with an internal combustion engine providing power for an operating mode of a grass mowing machine within a pedal based engine speed control range. A controller commands the engine to run at an engine speed above the pedal based engine speed control range based on a traction feedback signal from a hydrostatic traction drive system, for an adaptive engine speed control range above the pedal based engine speed control range.

The adaptive engine speed control system allows the mower to run at low power in economy or low noise modes, but can increase power if the mower encounters terrain or other circumstances with greater power requirements. The system allows operators to only run the engine at speeds required for the work being done, and can adapt the engine speed automatically based on need. The system also helps reduce fuel consumption and noise levels experienced around the mower, thus improving operator comfort and reducing noise pollution, but does not require sensors to measure hydraulic pressure of the hydrostatic traction drive circuit and/or hydraulic mowing circuit to determine power requirements.

DESCRIPTION OF THE PREFERRED EMBODIMENT

Figure 1:
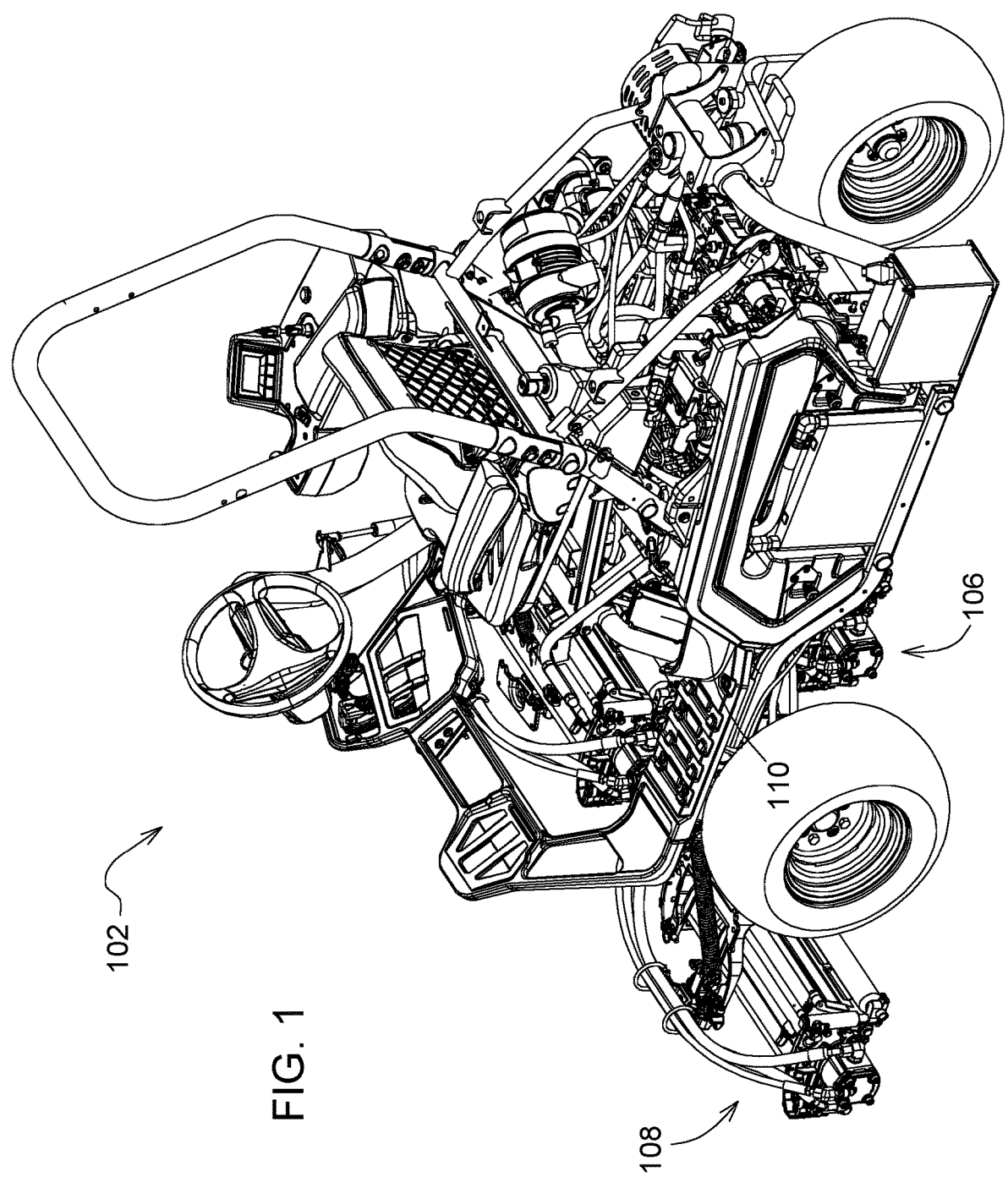
FIG. 1 is a perspective view of a riding greensmower with an adaptive engine speed control system according to one embodiment of the invention.

In an embodiment shown in FIG. 1, adaptive engine speed control (AESC) system 100 may be on riding greensmower 102 having three or more reel cutting units, or on a trim and surround mower or fairway mower with multiple reel cutting units. The mower may be powered by internal combustion engine 104, and may have a hydrostatic traction drive circuit 106, and/or hydraulic mow circuit 108, and a hydraulic lift and lower circuit for the cutting units. The AESC system may be included as software in vehicle controller 110 that provides PID control to the engine, also referred to as a PID controller.

Figure 2:
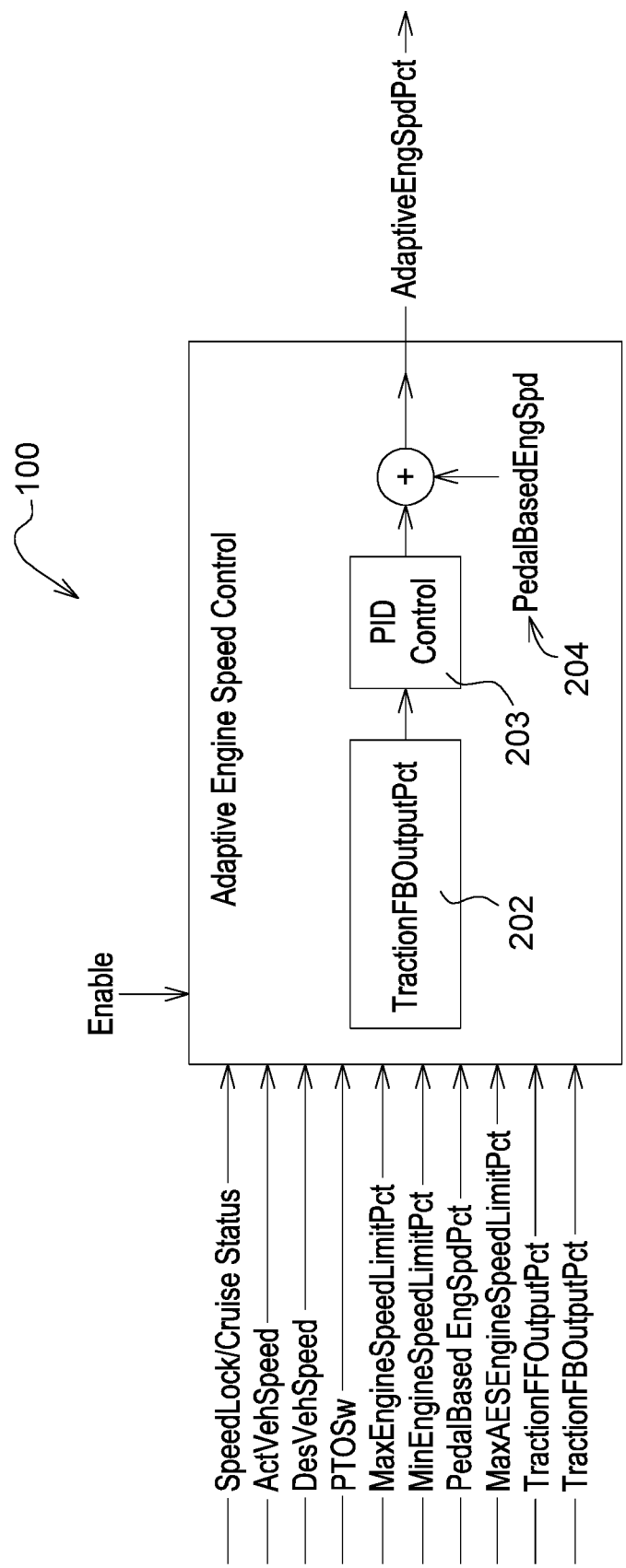
FIG. 2 is a block diagram of an adaptive engine speed control system according to one embodiment of the invention.

In an embodiment of the invention shown in FIG. 2, AESC system 100 may provide adaptive engine speed control to the internal combustion engine based on traction feedback output percent 202 from the hydrostatic traction drive system, PID control 203, and pedal based engine speed 204. Each of the traction feedback output and pedal based engine speed which may be expressed as a percent. The AESC system also may use other information available to the PID controller including enable status, speed lock/cruise status, actual vehicle speed, desired vehicle speed, PTO switch position, maximum pedal based engine speed percent, minimum pedal based engine speed percent, pedal based engine speed percent, maximum adaptive engine speed percent, and traction feed forward output percent.

Figure 3:
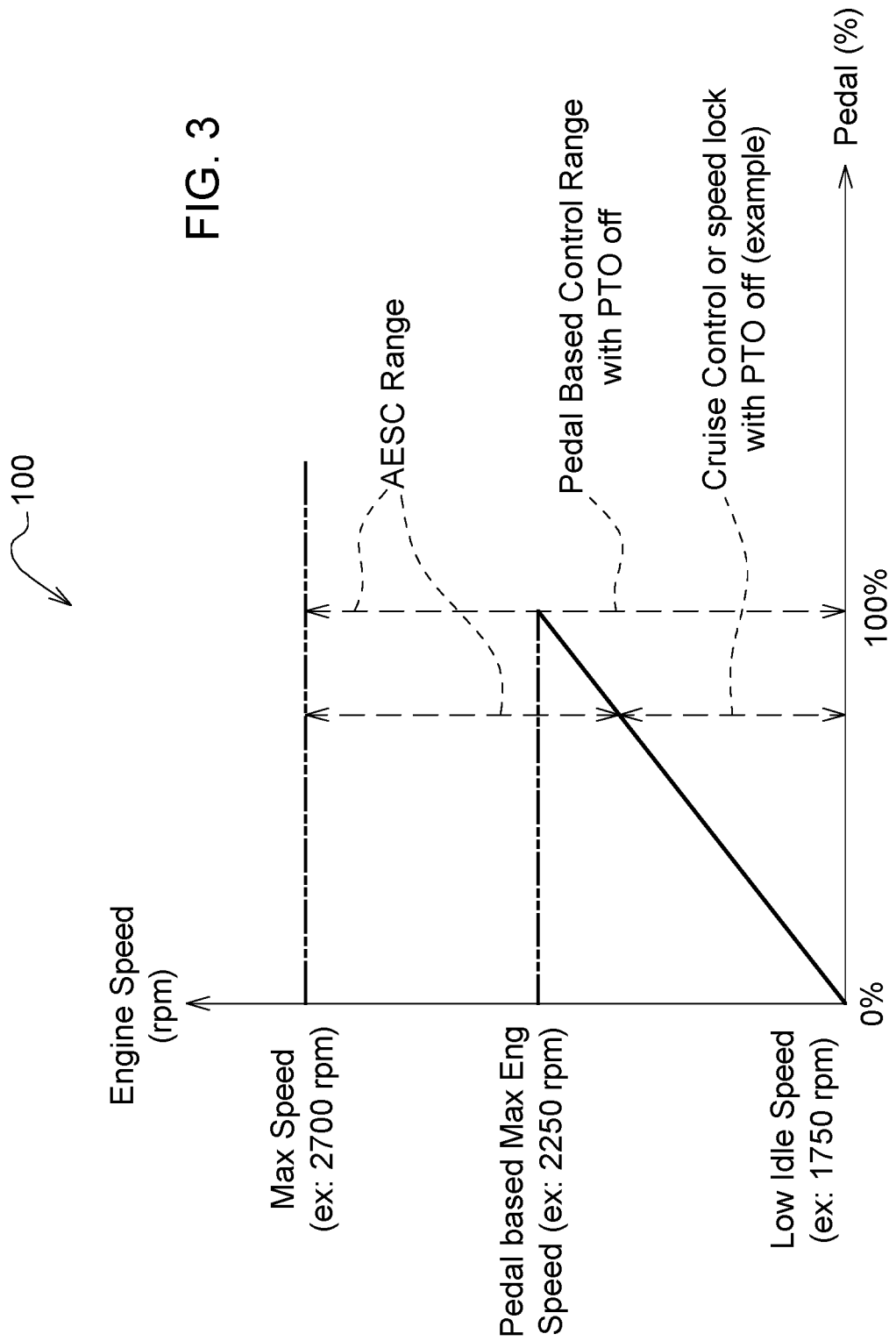
FIG. 3 is a diagram of an example of speed control ranges of an adaptive engine speed control system according to an embodiment of the invention.

In an embodiment of the invention shown in FIG. 3, the AESC system may increase engine speed above a pedal based engine speed control range. For example, the pedal based engine speed control range with the PTO off, for an engine mode designed to provide fuel economy or reduced sound, may be from 1750 rpm at a pedal position of 0%, up to a maximum of 2250 rpm at a pedal position of 100%. The AESC system may use the traction feedback output to determine when to increase engine speed above the pedal based engine speed control range to a higher adaptive engine speed control range. For example, the AESC system may increase the engine speed up to 2700 rpm or higher, which may be a high idle speed.

In the embodiment of FIGS. 1-4, the AESC system may be used with an internal combustion engine having one or more engine operating modes and one or more pedal based engine speed control ranges. For example, an economy mode may have a pedal based engine speed control range for transport when the PTO switch is off. Each engine operating mode may have a maximum allowed pedal based engine speed when pedal position is 100%. The AESC system also may be used with one or more engine operating modes having fixed engine speeds, such as 2250 rpm for mowing when the PTO switch is on. Additionally, the AESC system may be used with engines having cruise control or speed lock features in which a fixed engine speed may be set by the operator.

In the embodiment of FIGS. 1-4, the AESC system may command engine speed based on traction feedback output, also referred to as feedback current offset, from the hydrostatic traction drive system. The traction feedback output may be a percent based on load, which may be actual external load the hydrostatic traction drive system is experiencing or any variation in system parameters that cause the traction feed forward output to produce less output than desired based on pedal position. The traction feedback output may be the amount of current the controller adds or subtracts from the open loop traction feed forward current to the valves for the hydrostatic wheel motors. In normal conditions, actual vehicle speed may be close to desired vehicle speed. However, if traction drive load changes based on conditions, actual vehicle speed may decrease below the desired vehicle speed based on pedal position. As a result, the traction feedback output adds current to the open loop feed forward current. The AESC system of the present invention uses the traction feedback output to increase engine speed to satisfy power requirements.

Figure 4:
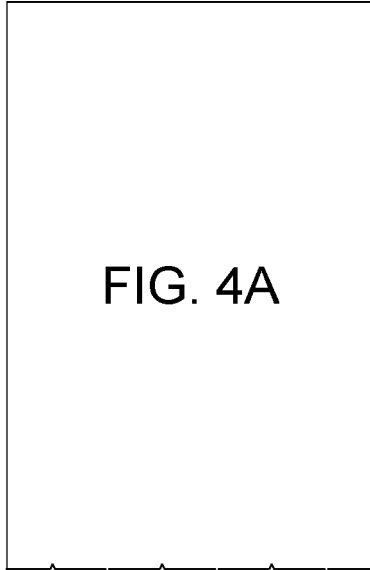
FIG. 4 comprises FIGS. 4A, 4B and 4C.
Figure 4:
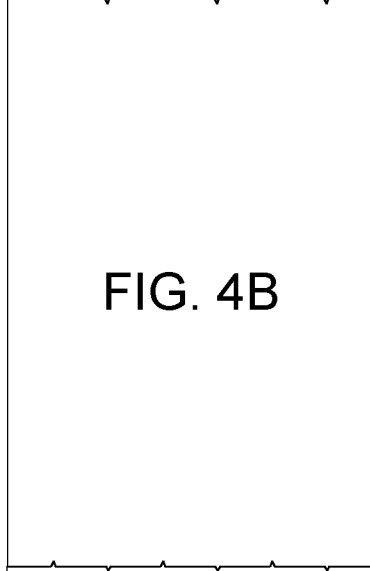
Figure 4:
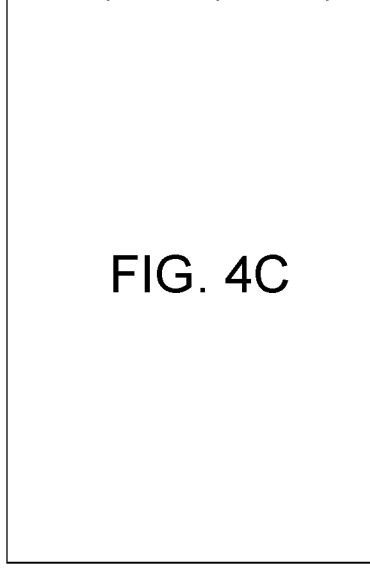
Figure 4A:
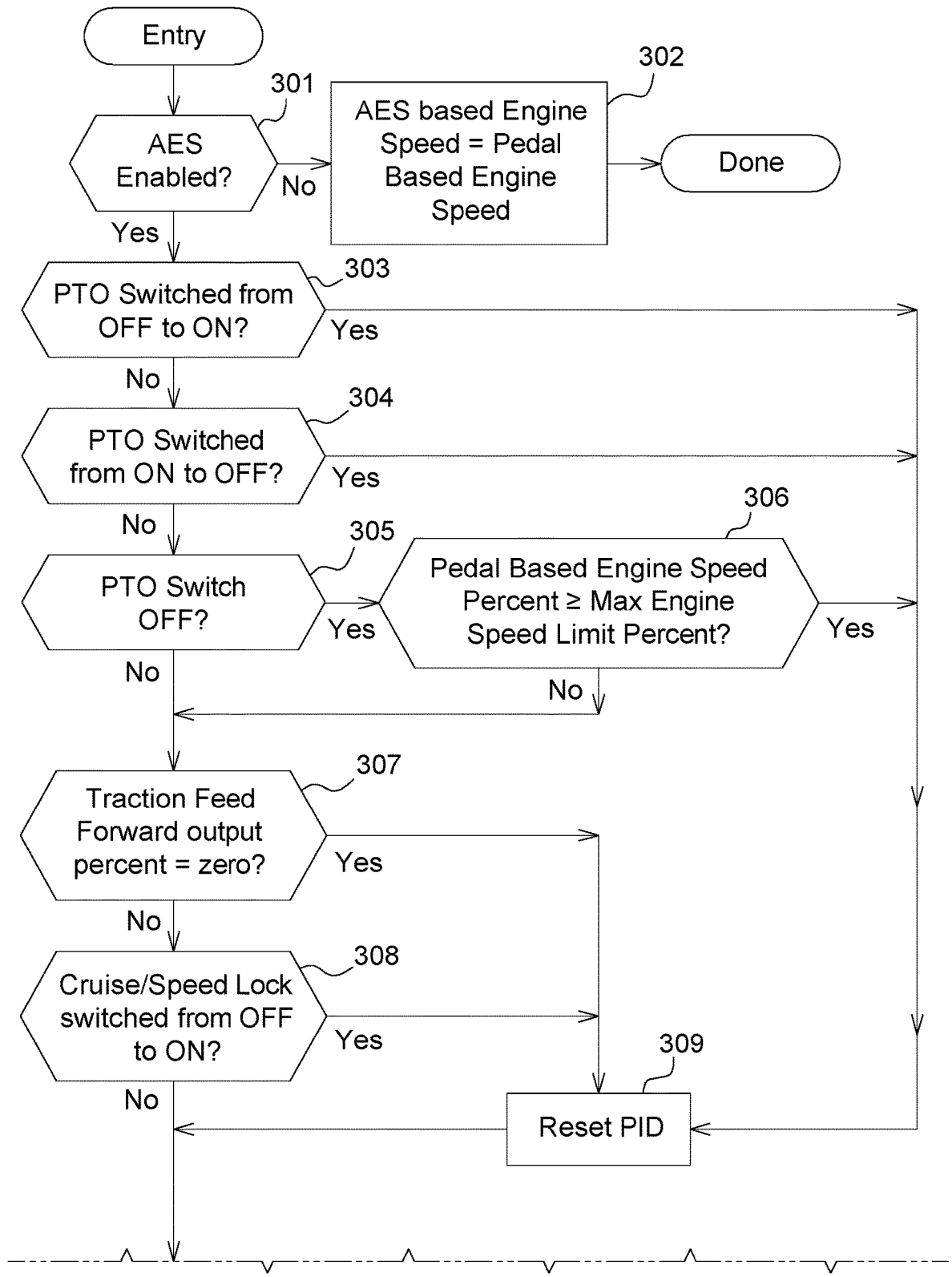
FIG. 4A is a first part of a software logic diagram of an adaptive engine speed control system according to an embodiment of the invention.
Figure 4B:
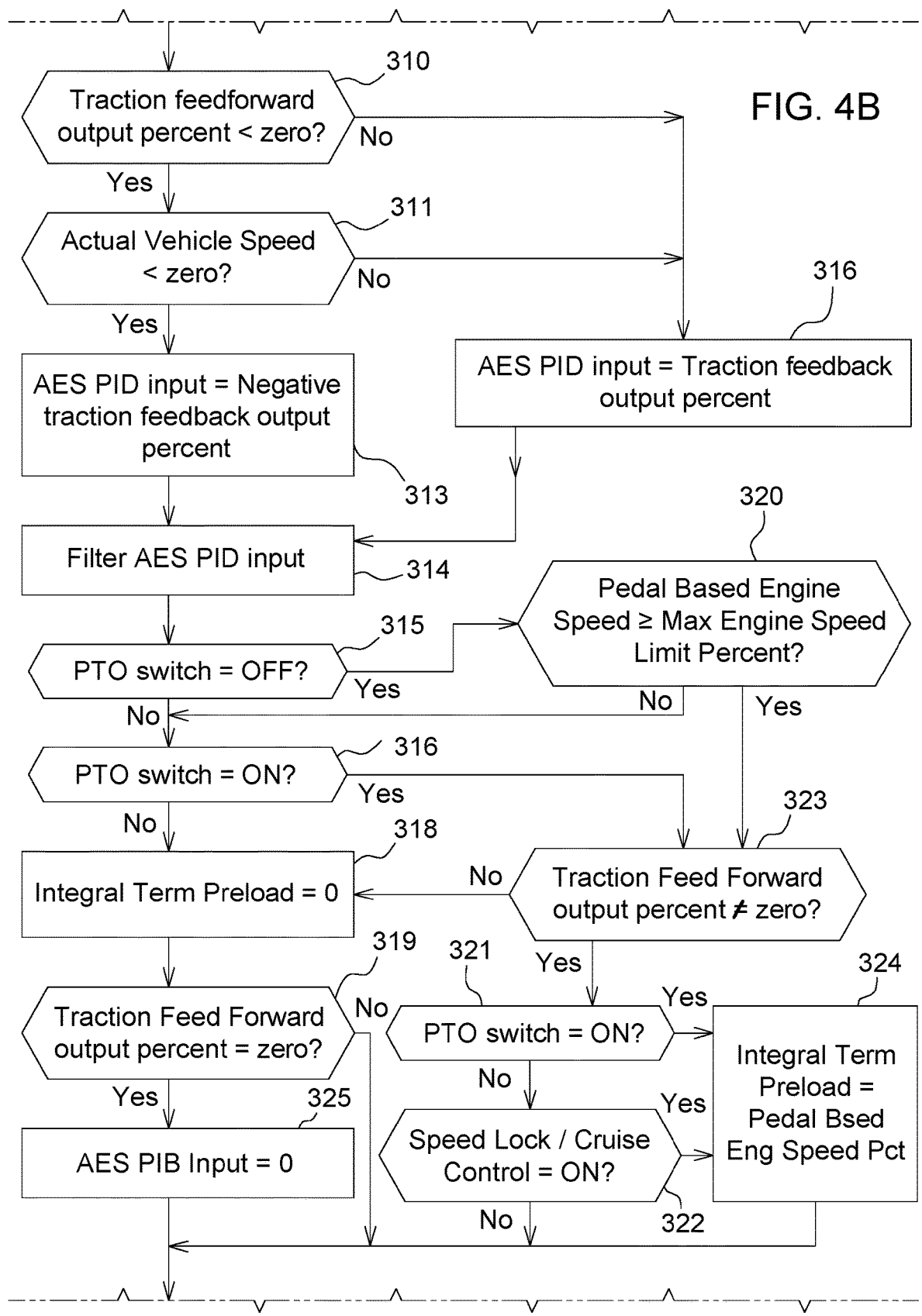
FIG. 4B is a second part of a software logic diagram of an adaptive speed control system according to an embodiment of the invention.
Figure 4C:
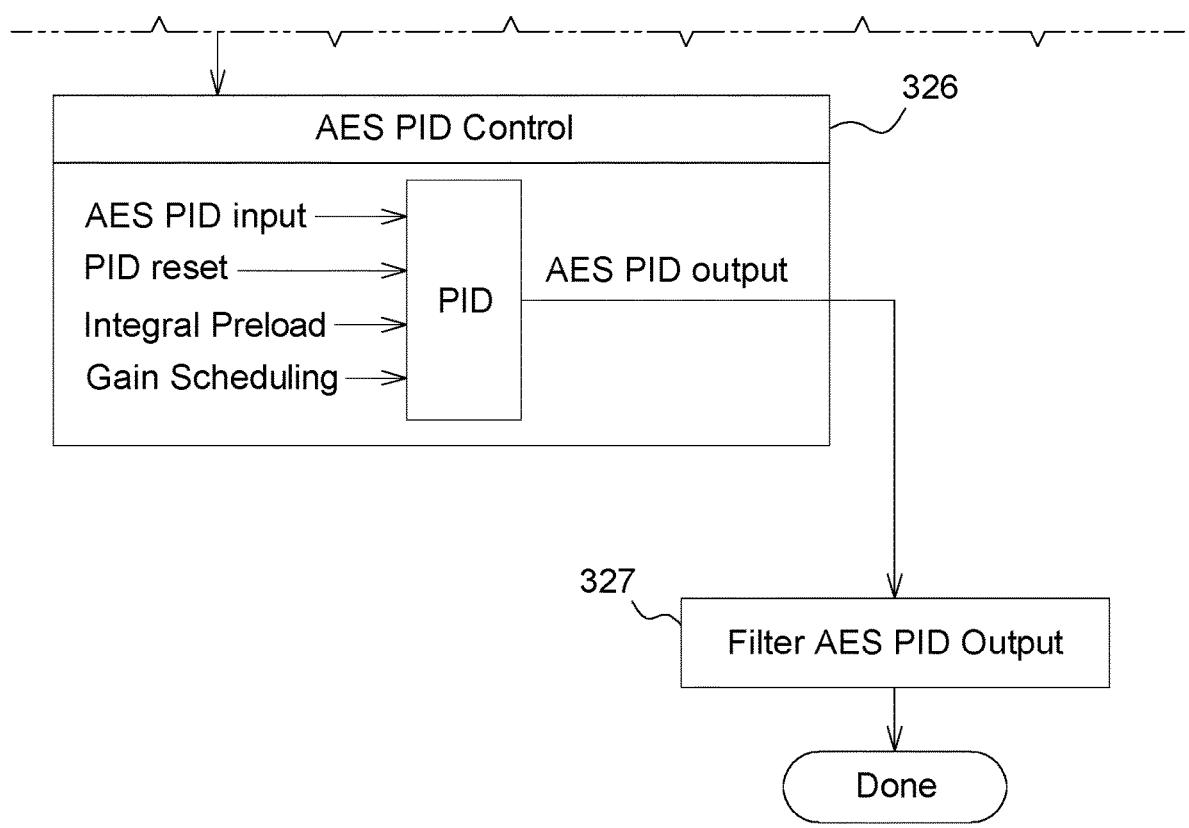
FIG. 4C is a third part of a software logic diagram of an adaptive speed control system according to an embodiment of the invention.

In one embodiment, the AESC system may include software logic shown in FIG. 4. The AESC system may be enabled in blocks 301-302. In block 301, the operator may actuate an enable switch or the PID controller may automatically activate the AESC system if the operator selects an engine operating mode that is enabled, such as economy mode, having a maximum allowed pedal based engine speed percent that is limited and is below the maximum adaptive engine speed. In block 302, if the AESC system is not enabled, the output of AESC system, expressed as a percent, may be the same pedal based engine speed.

In one embodiment shown in FIG. 4, the AESC system may determine PID reset conditions in blocks 303-309. For example, if there is a transition observed on the PTO switch, from OFF to ON in block 303, or from ON to OFF in block 304, the PID may be reset in block 309. If the PTO switch is OFF for transport in block 305, and the pedal based engine speed percent reaches or exceeds the maximum pedal based engine speed percent in block 306, the PID may be reset in block 309. Or if the traction feed forward output is zero in block 307, or the cruise control/speed lock is switched from OFF to ON in block 308, the PID may be reset in block 309.

In one embodiment shown in FIG. 4, the AESC system may determine the PID input to the engine in blocks 310-314. If the vehicle is moving forward, the AESC system may use the traction feedback output percent as the adaptive engine speed PID input in block 312. If the vehicle is moving in reverse, the AESC system may use the traction feedback output percent as the adaptive engine speed PID input in block 313, after reversing the sign from negative to positive. The AESC system determines if the vehicle is moving in reverse if the traction feed forward output percent is less than zero in block 310, or if the vehicle speed is less than zero in block 311. Traction feed forward output percent is the open loop signal to the wheel motors of the hydrostatic traction drive system, based on pedal input from the operator. Traction feedback output percent is the closed loop feedback output signal. In block 314, the AESC system may filter the adaptive engine speed PI D input using a first order low pass filter.

In one embodiment shown in FIG. 4, the AESC system may include PID input override logic in blocks 315-324. For example, the AESC system may preload zero for the integral term of the PID input in block 318, or the previous PID output for the integral term in block 322, or the pedal based engine speed percent for the integral term in block 324. The AESC system also may reset the PID input as zero in block 325. The override logic may be based on the status of the PTO switch (transport or mow) in blocks 315, 316 and 321; the status of cruise control or speed lock in block 322; if pedal based engine speed percent has reached or exceeded the maximum engine speed limit percent in block 320; and if the traction feed forward output percent is zero in blocks 319 and 323.

In one embodiment shown in FIG. 4, the AESC system may provide PID control in blocks 326-327. In block 326, the AESC system may use the AESC PID input from blocks 310-314, PID reset from blocks 303-309, integral preload from blocks 315-324, and Gain Scheduling, to determine the AESC PID output. Gain Scheduling may dynamically calculate the gain values for the P, I or D terms in the PID over a linear region of the control input. Gain scheduling may be used for a given system if different control efforts may be desired depending on the operating range, and may be achieved by having different gain values in the operating range. Block 327 may provide a first order low pass filter, along with a filter override to pass through the unfiltered PID output.

In one embodiment, the AESC system may use mow feedback output percent from the hydraulic mowing circuit to change engine speed. The mow feedback output percent may be the amount of current the PID controller adds or subtracts from feed forward current to the valves for the hydraulic reel motors. The controller may send open loop feed forward current signals to the valves to provide flow rates for desired reel speeds based on speed settings of the cutting units. In normal conditions, actual reel speeds may be close to desired reel speeds. However, if mowing load changes based on conditions, actual reel speed may decrease below the desired reel speed. As a result, the controller may determine the feedback output current offset that must be added or subtracted from the feed forward current for the desired reel speed. The adaptive engine speed control system may use the feedback current offset to estimate if and how much to increase engine speed to satisfy power requirements.

In one embodiment, the AESC system may automatically increase engine speed above the pedal based engine speed control range if increased load is detected for the hydrostatic traction drive circuit and/or hydraulic mow circuit. The AESC system may use the feedback current output from the hydrostatic traction drive circuit, and/or the feedback current output signal from the hydraulic mowing circuit, to detect and estimate the increased load and engine speed. The AESC may provide PID output to increase engine speed above the maximum allowed pedal based speed if there is an increase in power demand due to an increase in tractive load and/or mowing load. The AESC system may sum the estimated power requirements of the hydrostatic traction drive system and hydraulic mow system, and use the total to change the engine speed to meet the power requirements of the vehicle. The AESC system may eliminate the need and cost for additional sensors that measure hydraulic pressure of the hydrostatic traction drive circuit and/or hydraulic mow circuit.

Having described a preferred embodiment, it will become apparent that various modifications can be made without departing from the scope of the invention as defined in the accompanying claims.

The invention claimed is:

1. An adaptive engine speed control system, comprising: a PID controller commanding an internal combustion engine on a riding greensmower to run within [at] an adaptive engine speed control range having a higher engine speed for each pedal position than an engine mode with a pedal based engine speed control range if there is a feedback current output signal indicating at least one of a hydrostatic traction drive circuit and a hydraulic mowing circuit is operating below a desired speed from a feed forward current signal.

2. The adaptive engine speed control system of claim 1 wherein the internal combustion engine has a plurality of engine operating modes, each operating mode having a different pedal based engine speed control range.

3. The adaptive engine speed control system of claim 1 further comprising a PTO switch connected to the PID controller for activating the hydraulic mowing circuit and sets the engine speed a fixed speed for mowing within the pedal based engine speed control range.

4. The adaptive engine speed control system of claim 1 further comprising a cruise control setting in the pedal based engine speed control range.

5. An adaptive engine speed control system, comprising: an internal combustion engine providing power for a selected mode from a plurality of engine [an] operating modes of a grass mowing machine within a pedal based engine speed control range for each mode; and a controller commanding the engine to run at an engine speed above the pedal based engine speed control range for the selected mode based on a traction feedback signal from a hydrostatic traction drive system.

6. The adaptive engine speed control system of claim 5 further comprising an adaptive engine speed control range above the pedal based engine speed control range for each mode.

7. The adaptive engine speed control system of claim 5 wherein the pedal based engine speed control range is used for transporting a grass mowing machine when a plurality of cutting units are not mowing.

8. The adaptive engine speed control system of claim 7 further comprising a hydraulic mowing circuit for operating the plurality of cutting units.

9. An adaptive engine speed control system, comprising: a grass mowing machine having an internal combustion engine, a hydrostatic traction drive circuit and a hydraulic mowing circuit for operating a plurality of cutting units; and a controller that provides a traction feedback output signal if the grass mowing machine is moving at an actual ground speed that is below a pedal based desired ground speed in one of a plurality of operating modes; the controller using the traction feedback output signal to command the internal combustion engine to operate at a higher speed range above the [a] pedal based engine speed control range.

10. The adaptive engine speed control system of claim 9 wherein the controller provides a mowing feedback output signal if the grass mowing machine is mowing at a mower speed [is] below a desired mower speed setting; the controller using the mowing feedback output signal to command the internal combustion engine to an increased speed above a pedal based engine speed control range.

11. The adaptive engine speed control system of claim 9 wherein the plurality of cutting units are reel cutting units.

* * * * *